United States Patent
Geis et al.

Patent Number: 6,042,182
Date of Patent: Mar. 28, 2000

[54] INFANT CARRIER BASE

[75] Inventors: Mark Geis, Tipp City; Joseph J. Kelly, Mason; Herman Shie, Union, all of Ohio; Richard Scarpa, Alpharetta, Ga.

[73] Assignee: Evenflo Company, Inc., Vandalia, Ohio

[21] Appl. No.: 09/175,902

[22] Filed: Oct. 20, 1998

[51] Int. Cl.7 .............................. A47C 1/08; B60N 2/28
[52] U.S. Cl. .............................. 297/256.16; 297/256.13; 248/188.4; 248/688
[58] Field of Search ........................ 297/256.16, 256.13, 297/250.1, 270.1, 270.2, 270.4, 270.5, 130; 248/188.4, 688, 650

[56] References Cited

U.S. PATENT DOCUMENTS

| | | |
|---|---|---|
| D. 282,731 | 2/1986 | Kain . |
| D. 289,465 | 4/1987 | Wise . |
| D. 294,310 | 2/1988 | Wise et al. . |
| D. 294,777 | 3/1988 | Wise et al. . |
| D. 311,822 | 11/1990 | Meeker . |
| D. 353,288 | 12/1994 | Kain . |
| D. 357,439 | 4/1995 | Haut et al. . |
| D. 362,832 | 10/1995 | Haut et al. . |
| D. 369,707 | 5/1996 | Kain . |
| D. 378,908 | 4/1997 | Courtney et al. . |
| D. 390,168 | 2/1998 | Haut . |
| 702,331 | 6/1902 | Roberts ............... 297/270.2 X |
| 3,653,341 | 4/1972 | Nielsen ............... 248/188.4 X |
| 4,205,876 | 6/1980 | Cetina ............... 297/270.5 X |
| 4,634,177 | 1/1987 | Meeker . |
| 4,790,593 | 12/1988 | Davalos et al. ............... 297/256.13 X |
| 4,796,791 | 1/1989 | Goss ............... 248/650 X |
| 4,819,958 | 4/1989 | Perego . |
| 4,943,113 | 7/1990 | Meeker . |
| 5,092,004 | 3/1992 | Cone et al. . |
| 5,104,134 | 4/1992 | Cone . |
| 5,133,567 | 7/1992 | Owens . |
| 5,276,941 | 1/1994 | Chen . |
| 5,277,472 | 1/1994 | Freese et al. . |
| 5,282,593 | 2/1994 | Fast ............... 248/188.4 |
| 5,324,094 | 6/1994 | Kain . |
| 5,332,182 | 7/1994 | Weisz et al. ............... 248/188.4 |
| 5,385,387 | 1/1995 | Kain . |
| 5,409,292 | 4/1995 | Kain et al. . |
| 5,454,584 | 10/1995 | Haut et al. . |
| 5,478,135 | 12/1995 | Kain . |
| 5,490,685 | 2/1996 | Kitayama et al. . |
| 5,516,190 | 5/1996 | Kain et al. . |
| 5,533,457 | 7/1996 | Cox ............... 248/188.4 X |
| 5,575,530 | 11/1996 | Harper et al. ............... 297/270.2 X |
| 5,605,409 | 2/1997 | Haut et al. . |
| 5,645,293 | 7/1997 | Cheng . |
| 5,676,386 | 10/1997 | Huang . |
| 5,727,798 | 3/1998 | Walters et al. . |
| 5,772,279 | 6/1998 | Johnson, Jr. ............... 297/130 |
| 5,810,436 | 9/1998 | Surot ............... 297/256.13 |
| 5,836,650 | 11/1998 | Warner, Jr. et al. ............... 297/256.13 X |

FOREIGN PATENT DOCUMENTS

| | | | |
|---|---|---|---|
| 092013064 | 10/1993 | Australia | ............... 297/250.1 |
| 969278 | 12/1950 | France | ............... 297/130 |
| 109728 | 9/1917 | United Kingdom | ............... 248/188.4 |

*Primary Examiner*—Peter M. Cuomo
*Assistant Examiner*—David E. Allred
*Attorney, Agent, or Firm*—Thompson Hine & Flory LLP

[57] ABSTRACT

An infant carrier base including a frame having a head edge and a foot edge and side edges with an upper surface and a lower surface. The base has a cylindrical aperture formed vertically through the carrier and female threads extending radially inwardly with respect to the aperture. A cylindrical adjustment rod is provided with male threads extending radially outwardly along the length thereof. A dial is secured with respect to the upper end of the cylindrical adjustment rod and a levelling foot is secured with respect to the lower end of the adjustment rod.

4 Claims, 3 Drawing Sheets

INFANT CARRIER BASE

BACKGROUND OF THE INVENTION

1. Field of the Invention

The present invention relates to an infant carrier base and more particularly pertains to removably receiving an infant carrier with respect to the seat of a vehicle through a base adjustably positionable upon the seat.

2. Description of the Prior Art

The use of child care products of known designs and configurations is known in the prior art. More specifically, child care products of known designs and configurations heretofore devised and utilized for the purpose of improving the safety and comfort of children through known methods and apparatuses are known to consist basically of familiar, expected, and obvious structural configurations, notwithstanding the myriad of designs encompassed by the crowded prior art which has been developed for the fulfillment of countless objectives and requirements.

By way of example, U.S. Pat. No. 5,478,135 to Kain discloses a child carrier with a detachable base.

While this device fulfills its respective, particular objectives and requirements, the aforementioned patent does not describe an infant carrier base with angular adjustment capabilities as disclosed herein.

In this respect, the infant carrier base according to the present invention substantially departs from the conventional concepts and designs of the prior art, and in doing so provides an apparatus primarily developed for the purpose of removably receiving an infant carrier with respect to the seat of a vehicle through a base adjustably positionable upon the seat.

Therefore, it can be appreciated that there exists a continuing need for a new and improved infant carrier base which can be used for removably receiving an infant carrier with respect to the seat of a vehicle through a base adjustably positionable upon the seat. In this regard, the present invention substantially fulfills this need.

SUMMARY OF THE INVENTION

In view of the foregoing disadvantages inherent in the known types of child care products of known designs and configurations now present in the prior art, the present invention provides an improved infant carrier base. As such, the general purpose of the present invention, which will be described subsequently in greater detail, is to provide a new and improved infant carrier base and method which has all the advantages of the prior art and none of the disadvantages.

To attain this, the present invention essentially comprises an angularly adjustable infant carrier base for receiving an infant carrier comprising, in combination a frame with a head edge and a foot edge and parallel side edges. The frame also has an upper surface and a lower surface. The upper surface is configured to receive thereon an infant carrier and the lower surface is adapted to be received upon the seat of a vehicle and releasably held thereto by a vehicle seat belt. Attachment mechanisms are provided in the frame to lock and unlock an infant carrier with respect thereto. Also provided is a cylindrical aperture recess formed vertically through the carrier adjacent to the foot edge intermediate the side edges. A generally cylindrical sleeve is fixedly received within the aperture with female threads formed in the interior surface of the sleeve and with an enlarged annular recess in the sleeve above the female threads. A cylindrical adjustment rod is rotatably positioned within the sleeve and the rod has male threads along essentially the entire length thereof. A cylindrical dial is rotatably secured to the upper end of the cylindrical rod above the sleeve. Lastly provided is a levelling foot which is secured to the lower end of the rod adapted to be raised by the rotation of the dial in a first direction and to be lowered beneath the lower surface of the base upon rotation of the dial in the opposite direction to allow the angle of repose of the base from the seat to be varied as a function of the rotational position of the dial and the location of the foot beneath the lower surface, the threads having a pitch of about 0.167 inches, to allow for a rapid adjustment of the angle of repose. Each thread has an angle of about 45 degrees above and an angle of about 7 degrees below with a flat of about 0.27 inches which allows for ease of turning whether up or down and for retaining its position after being set.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved infant carrier base which has all of the advantages of the prior art child care products of known designs and configurations and none of the disadvantages.

It is another object of the present invention to provide a new and improved infant carrier base which provides greater safety to the infant occupant and which may be easily and efficiently manufactured and marketed.

It is a further object of the present invention to provide a new and improved infant carrier base which increases the comfort of an infant user and which is of durable and reliable constructions.

An even further object of the present invention is to provide a new and improved infant carrier base which is susceptible of a low cost of manufacture with regard to both materials and labor, and which accordingly is then susceptible of low prices of sale to the consuming public, thereby making such An infant carrier base economically available to the buying public.

Even still another object of the present invention is to provide an infant carrier base for removably receiving an infant carrier with respect to the seat of a vehicle through a base adjustably positionable upon the seat.

Lastly, it is an object of the present invention to provide a new and improved infant carrier base including a frame having a head edge and a foot edge and side edges with an upper surface and a lower surface. The base has a cylindrical aperture formed vertically through the carrier and female threads extending radially inwardly with respect to the aperture. A cylindrical adjustment rod is provided with male threads extending radially outwardly along the length thereof. A dial is secured with respect to the upper end of the cylindrical adjustment rod and a levelling foot is secured with respect to the lower end of the adjustment rod.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts through the various Figures.

DESCRIPTION OF THE PREFERRED EMBODIMENT

Figure 1:
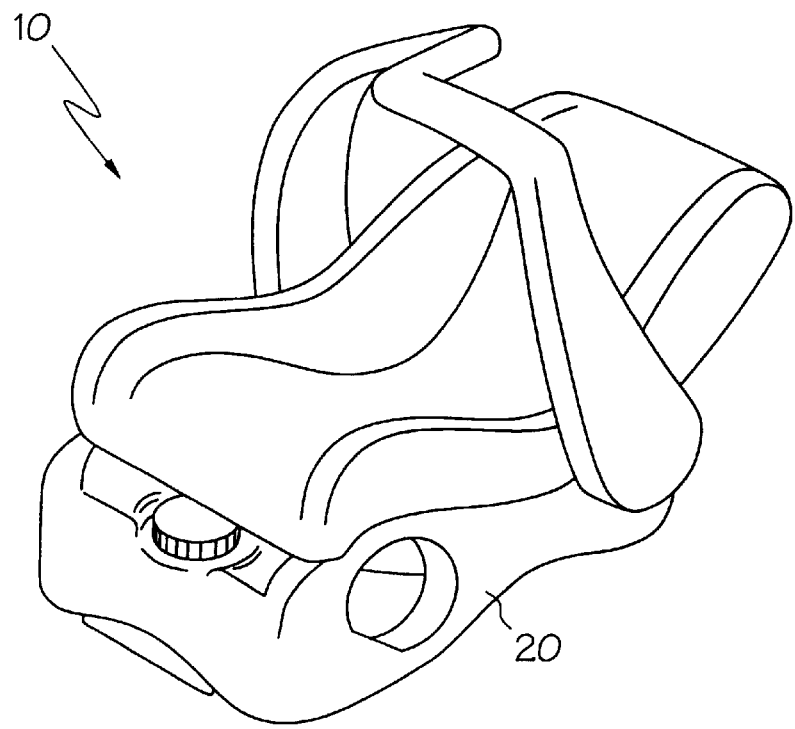
FIG. 1 is a perspective view of the preferred embodiment of the infant carrier base constructed in accordance with the principles of the present invention.

With reference now to the drawings, and in particular to FIG. 1 thereof, the preferred embodiment of the new and improved infant carrier base embodying the principles and concepts of the present invention and generally designated by the reference numeral 10 will be described.

There is shown in FIG. 1, the base of the present invention for receiving an infant carrier. The carrier is a conventionally molded padded member having a head end and a food end with sides extending between the ends. The carrier includes a harness, not shown, for retaining the child therein. A handle is rotatably attached to the carrier.

Figure 2:
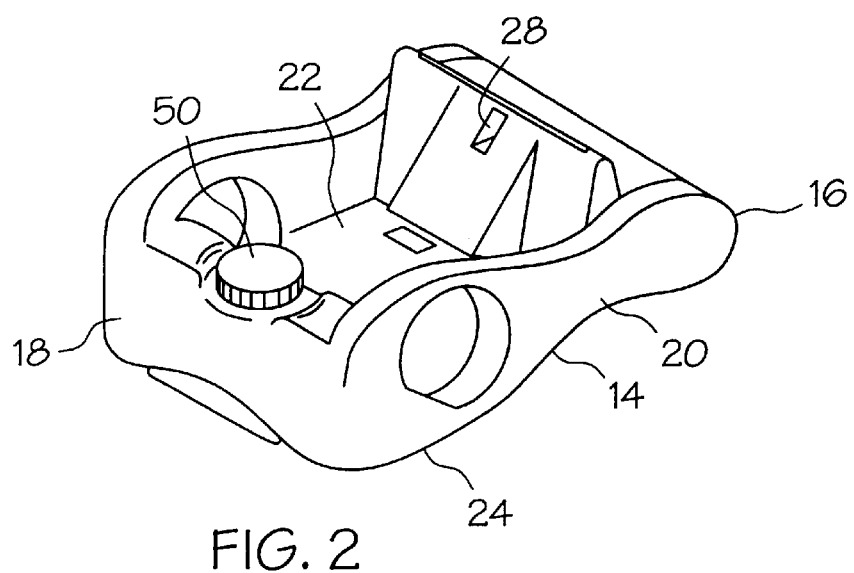
FIG. 2 is perspective view similar to FIG. 1 but with the infant carrier removed.

FIG. 2 is a perspective view showing the base separated from the seat. Apertures accommodate an automobile seat belt when in use.

The base is preferably of a molded unitary structure and includes an arcuate inner surface, head end, and foot end interconnected by side walls. The side walls include apertures for the vehicle seat base.

Figure 3:
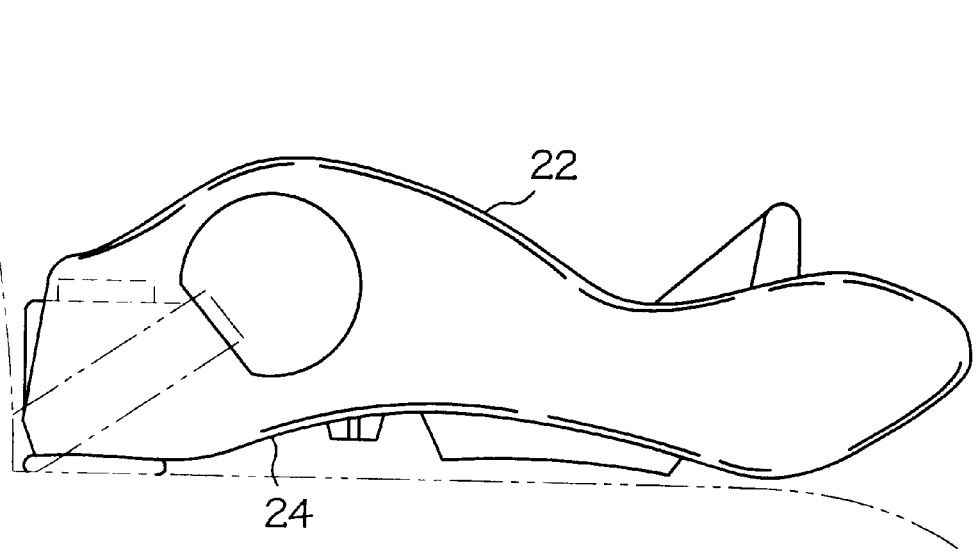
FIG. 3 is a side elevational view of the base of FIG. 2.

The base is shown in side elevation in FIG. 3 with the base being secured by a vehicle seat belt through apertures.

Figure 4:
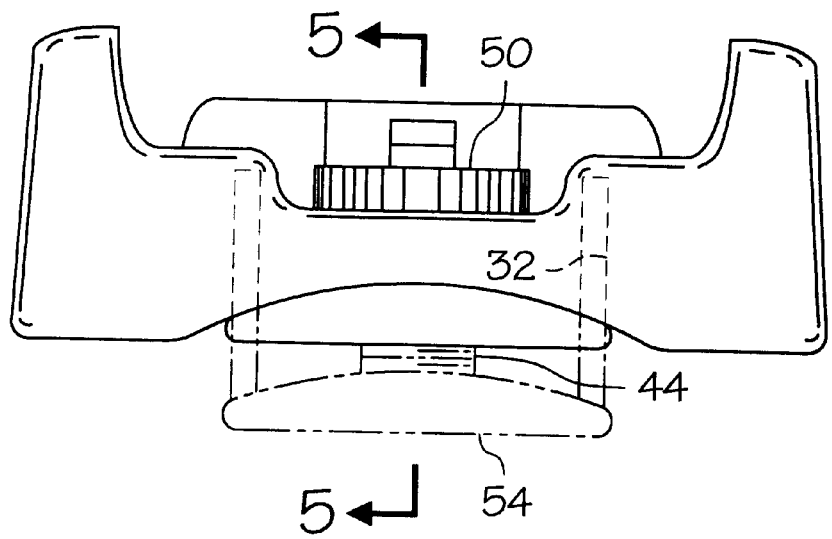
FIG. 4 is front elevational view of the base of the prior Figures but with the foot extended.

FIG. 4 is a front elevational view to more clearly illustrate the foot component of the adjustment mechanisms. The foot component is shown in an extended orientation.

Figure 5:
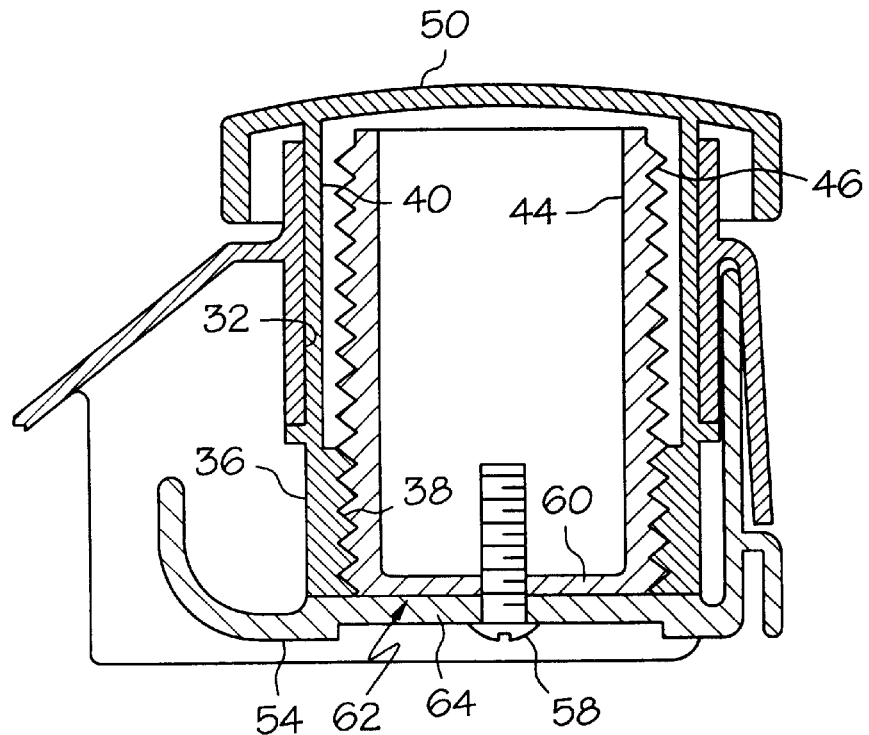
FIG. 5 is cross sectional view taken along line 5—5 of FIG. 4.
Figure 6:
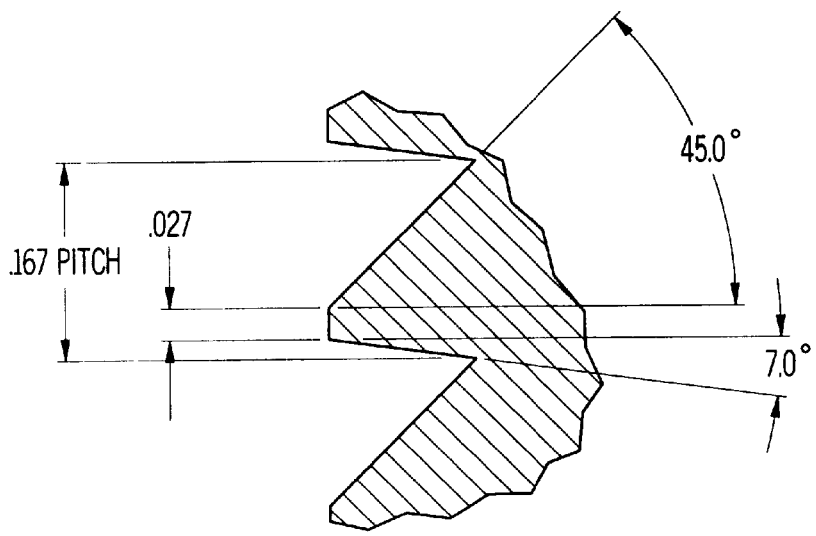
FIG. 6 is a cross sectional view of a portion of the screw.

FIG. 5 is a sectional view taken through line 5—5 of FIG. 4. Such figure illustrates the angular adjustment mechanisms. The upper surface of the base includes a head end and a foot end configured so as to mate with the lower surface of the seat.

The present invention relates to angular adjustment capabilities and mechanisms as will be more specifically described hereinafter. The majority of the components as described hereinabove, the infant carrier and the base, are as essentially described in the above referred to U.S. Pat. No. 5,475,135 to Kain, the subject matter of which is incorporated herein by reference.

The angularly adjustable infant carrier base 10 is for receiving an infant carrier system 10. Such system comprises, in combination, a frame 14 having a head edge 16 and a foot edge 18. Parallel side edges 20 extend therebetween. The base also has an upper surface 22 and a lower surface 24. The upper surface of the base is configured to receive thereon an infant carrier. The lower surface of the base is adapted to be received upon the seat of a vehicle and releasably held thereto by a vehicle seat belt.

Also provided as part of the system are attachment mechanisms 28 in the frame. Such mechanisms function to lock and unlock an infant carrier with respect thereto. Note the aforementioned patent to Kain for further details of operation.

Additionally provided as part of the base is a cylindrical recess aperture 32 formed vertically through the carrier. Such aperture 32 is located adjacent to the foot edge intermediate the side edges.

A generally cylindrical sleeve 36 is fixedly received within the aperture. The sleeve is formed with female threads 38 located in the interior surface of the sleeve. An enlarged annular recess 40 is formed in the sleeve above the female threads.

A cylindrical adjustment rod 44 is rotatably positioned within the sleeve. The rod has male threads 46 along essentially the entire length thereof. The threads 38 of the sleeve and the threads of the rod are of similar size and shape and in rotatable mating contact.

Additionally, a cylindrical dial 50 is rotatably secured to the upper end of the sleeve above the cylindrical rod. Rotation of the dial effects concurrent rotation of the rod for raising and lowering the rod with respect to the sleeve and base.

Lastly provided is a levelling foot 54. Such foot is secured to the lower end of the rod and adapted to be raised by the rotation of the dial in a first direction and to be lowered beneath the lower surface of the base upon rotation of the dial in the opposite direction to allow the angle of repose of the base from the seat to be varied as a function of the rotational position of the dial and the location of the foot beneath the lower surface, the threads having a pitch of about 0.167 inches to allow for a rapid adjustment of the angle of repose. Each thread has an angle of about 45 degrees above and an angle of about 7 degrees below with a flat of about 0.27 inches which allows for ease of turning whether up or down and for retaining its position after being set.

A bolt 58 threadedly couples the foot and the lower face 60 of the rod. A projection 62 extends downwardly from the rod face to be received within an opening 64 in the upper surface of the foot to preclude inadvertent rotation therebetween.

The present invention is thus a new infant car seat base to be used with an infant car seat. The design is comprised of a molded base unit containing an integral screw-action recline mechanism and angle gauges which will allow the user to more readily achieve the optimum angle of seat inclination, 45 degrees, when installing an infant seat in a vehicle. The new base also establishes a distinct, improved infant seat in a vehicle. The new base also establishes a distinct, improved aesthetic design to more fully complement the current commercial infant seats.

The recline mechanism described above is composed of four injection-molded plastic parts a knob (either one piece plastic or co-molded with a tactile grid surface), a threaded flange or sleeve, a threaded post or rod, and a foot. The threaded flange is attached to the knob, the resulting assembly being captured by the molded base, and spinning freely about a collar protruding from the base. The threaded rod is attached to the foot, and this assembly is inserted into the knob/flange assembly such that the act of turning the knob will cause the foot to raise or lower with respect to the base, the base being molded in such a way as to prevent rotation of the foot. When the base assembly is correctly installed in a vehicle seat with the foot resting on the seat surface adjacent to the seat bight, the change in foot travel will result in a change of seat angle.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. An angularly adjustable infant carrier base for receiving an infant carrier comprising, in combination:

a frame having a head edge and a foot edge and parallel side edges with an upper surface and a lower surface, the upper surface being configured to receive thereon an infant carrier and the lower surface adapted to be received upon the seat of a vehicle and releasably held thereto by a vehicle seat belt;

attachment mechanisms in the frame to lock and unlock an infant carrier with respect thereto;

a cylindrical aperture recess formed vertically through the carrier adjacent to the foot edge intermediate the side edges;

a generally cylindrical sleeve fixedly received within the aperture with female threads formed in the interior surface of the sleeve and with an enlarged annular recess in the sleeve above the female threads;

a cylindrical adjustment rod rotatably positioned within the sleeve, the rod having male threads along essentially an entire length thereof;

a cylindrical dial rotatably secured to an upper end of the sleeve above the cylindrical rod; and a leveling foot secured to the lower end of the rod and adapted to be raised by a rotation of the dial in a first direction and to be lowered beneath the lower surface of the base upon rotation of a dial in the opposite second direction to allow the angle of repose of the base relative to the seat to be varied as a function of the rotational position of the dial and the location of the foot beneath the lower surface, the threads having a pitch of substantially 0.167 inches, to allow for a rapid adjustment of the angle of repose. Each thread has an angle of substantially 45 degrees above and an angle of substantially 7 degrees below with a flat of substantially 0.027 inches which allows for ease of turning whether up or down and for retaining its position after being set.

2. The apparatus as set forth in claim 1 and further including means to couple the foot and the base and preclude inadvertent rotation therebetween.

3. An infant carrier base comprising:

a frame having a head edge and a foot edge and side edges, said frame having an upper surface and a lower surface;

a cylindrical aperture formed vertically through the carrier base and female threads extending radially inward with respect to the aperture;

a cylindrical adjustment rod having male threads extending radially outwardly along a length thereof;

a dial secured to the frame adjacent to an upper end of the aperture; and a leveling foot secured to the lower end of the adjustment rod and adapted to be raised by a rotation of the dial in a first direction and to be lowered by a rotation of the dial in an opposite second direction, the threads having a pitch of substantially 0.167 inches, an angle of substantially 45 degrees above and an angle of substantially 7 degrees below with a flat of substantially 0.027 inches.

4. The apparatus as set forth in claim 3 and further including means to couple the foot and the base and preclude inadvertent rotation therebetween.

* * * * *